(No Model.)
G. SCHUMACHER.
VEHICLE.
No. 506,946. Patented Oct. 17, 1893.
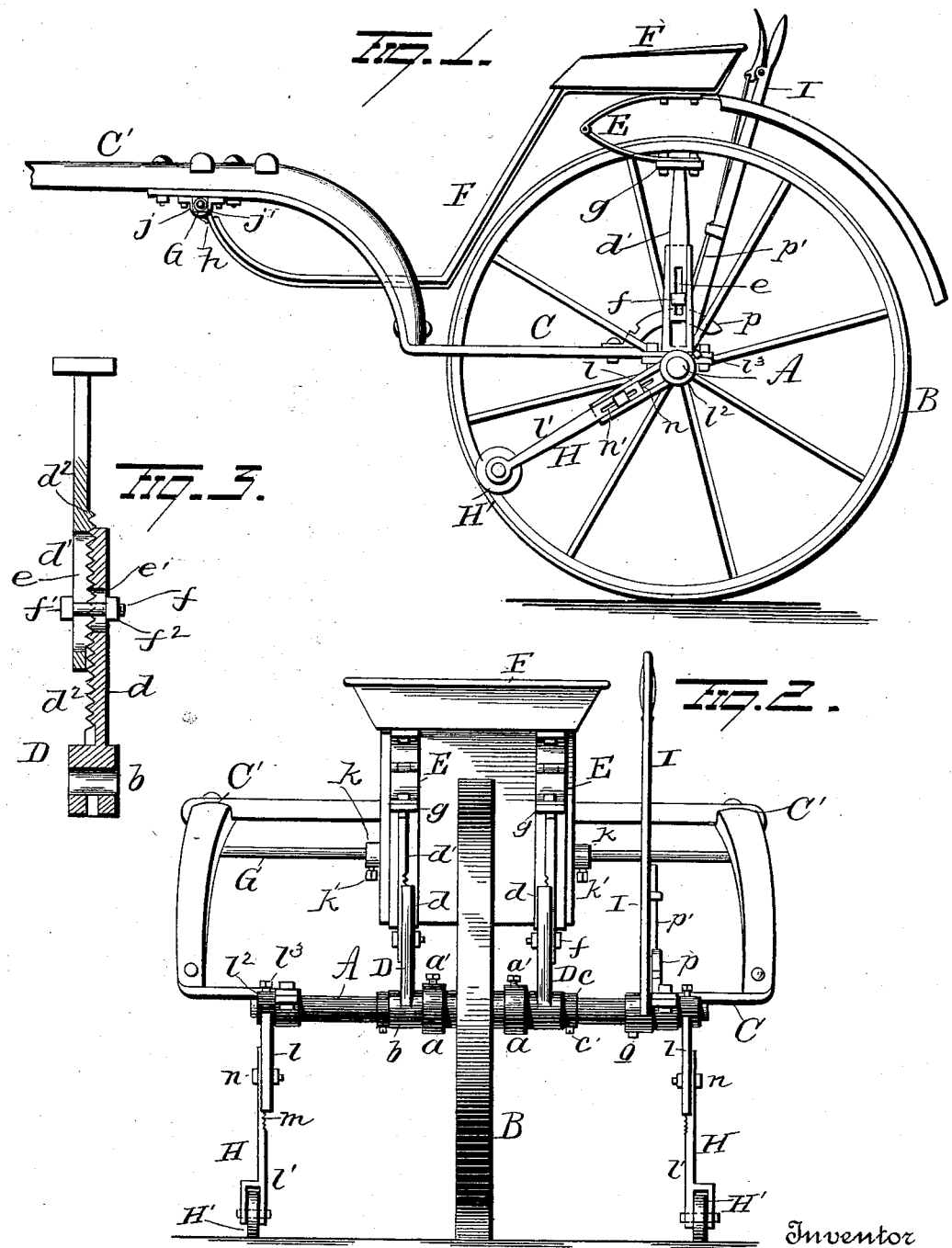
Witnesses
E. Nottingham
G. F. Downing
Inventor
G. Schumacher
By H. A. Seymour
Attorney

UNITED STATES PATENT OFFICE.

GODFRIED SCHUMACHER, OF BATESVILLE, INDIANA.

VEHICLE.

SPECIFICATION forming part of Letters Patent No. 506,946, dated October 17, 1893.

Application filed June 21, 1893. Serial No. 478,374. (No model.)

*To all whom it may concern:*

Be it known that I, GODFRIED SCHUMACHER, residing at Batesville, in the county of Ripley and State of Indiana, have invented certain new and useful Improvements in Vehicles; and I do hereby declare the following to be a full, clear, and exact description of the invention, such as will enable others skilled in the art to which it appertains to make and use the same.

My invention relates to an improvement in vehicles, and more particularly to sulkies which employ but a single carrying wheel,—the object of the invention being to produce a vehicle of the class above mentioned which shall be simple in construction, cheap to manufacture, durable, capable of adjustment in all its parts and which shall be effectual in every respect, in the performance of its functions.

With this object in view the invention consists in certain novel features of construction and combinations and arrangements of parts as hereinafter set forth and pointed out in the claims.

In the accompanying drawings, Figure 1 is a plan view illustrating my improvements. Fig. 2 is an end view. Fig. 3 is a detail view.

A represents an axle, which carries, at a point between its ends, a wheel B. The wheel B is adapted to be adjusted on the axle as occasion may require, and is prevented from accidental lateral displacement by means of collars $a$ secured to the axle by set screws $a'$. Thill irons C are connected at one end to the axle A and at the other end secured to the thills $C'$.

Seat standards D are adjustably connected to the axle A by means of collars $b$ at their lower ends, and said seat standards are prevented from accidental lateral movement by means of collars $c$ held in place on the axle by set screws $c'$,—the collars $a$ serving to prevent lateral movement of the seat standards toward the hub of the wheel B. Each seat standard is made in two parts $d, d'$, and each part of each standard is provided with teeth $d^2$ so that when the parts $d, d'$ are placed together these teeth will mesh and prevent the upper part $d'$ of the standards from moving independently of the other part $d$. The parts $d, d'$ of the standards D are provided with elongated slots $e, e'$ adapted to align with each other, and through these slots a bolt $f$ is passed, said bolt being provided at one end with a head $f'$ and at the other end with screwthreads for the reception of a nut $f^2$. By thus constructing and arranging the seat standards it will be seen that they can not only be adjusted on the axle A, but they can also be adjusted vertically, and that when the parts $d, d'$ are secured together, they will withstand the requisite amount of weight without danger of displacement. The upper end of the upper part $d'$ of each standard is made with lugs or ears $g$, which are perforated for the reception of suitable bolts whereby to secure the seat springs E thereto, and on these seat springs, the seat F is located.

The front end of the seat is preferably provided with collars or loops $h$ for the reception of a rod or shaft G, by which the front end of the seat is supported. The ends of the rod or shaft G are preferably mounted in suitable brackets $j$ secured to the thills $C'$, preferably under the single-tree, and said rod or shaft is provided at its ends with taps $j'$. The front end of the seat can be adjusted on the rod or shaft G at the same time that the seat standards are adjusted, and said front end of the seat is prevented from accidental lateral displacement by means of collars $k$, held on the shaft or rod G by set screws $k'$.

When the vehicle is at a standstill it is desirable that it be maintained in a level or horizontal position in order that the rider may be enabled to readily enter or leave the same. I therefore provide two props or legs H, H,—one at each end of the axle A. Each prop or leg H is made in two parts, $l, l'$, the upper part $l$ being provided with a collar $l^2$ for the reception of the end of the axle and is retained on said axle by means of a set screw $l^3$. Both parts $l, l'$ of the legs or props H, are made with teeth $m$ which mesh with each other, as above explained in regard to the seat standards, and the parts of each prop are provided with elongated slots $n, n'$ respectively, for the reception of a bolt $n$, said bolt being provided at one end with a head and at the other end with a nut. From this construction of prop it will be seen that the same can be readily adjusted vertically to adapt them to vehicles, regardless of the size of the carrying wheel thereof. In the lower ends of the parts *l* of the props H wheels H' are mounted,—which wheels may run on the ground should the props be down when the vehicle is in motion.

It will not usually be desired that the props shall be in their lower position as shown in Fig. 2, when the vehicle is in motion, and in order that they may be readily raised and lowered as desired, a lever I is secured (preferably adjustable by means of a set screw *o*) to the axle, the handle of said lever being within easy reach of the rider. A toothed segment *p* is secured, preferably to one of the thill irons C, and is adapted to be engaged by a latch bar *p'* carried by the lever I, whereby to lock said lever and thus retain the props in the desired position.

My improvements are very simple in construction, are capable of adjustment in every respect and are effectual in the performance of their functions.

Having fully described my invention, what I claim as new, and desire to secure by Letters Patent, is—

1. In a vehicle, the combination with the thills, of an axle connected thereto and a carrying wheel adjustable on said axle, substantially as set forth.

2. In a vehicle, the combination with the thills, of an axle connected thereto, a carrying wheel adjustable on said axle, and adjustable collars on said axle for preventing accidental displacement of said wheel, substantially as set forth.

3. In a vehicle, the combination with the thills, axle and an adjustable carrying wheel on said axle, of a seat adjustably supported by said axle and thills, substantially as set forth.

4. In a vehicle, the combination with an axle and wheel, of seat standards adjustably secured to said axle, and a seat on said standards, substantially as set forth.

5. In a vehicle, the combination with an axle and wheel, of seat standards adjustably supported by said axle, and a seat adjustably supported by said standards, substantially as set forth.

6. In a vehicle, the combination with an axle and wheel, of seat standards mounted adjustably on said axle, and collars on said axle for preventing accidental displacement of said seat standards and a seat on said seat standards, substantially as set forth.

7. In a vehicle, the combination with an axle and wheel, of adjustable seat standards adjustably mounted on said axle, and a seat on said standards, substantially as set forth.

8. In a vehicle, the combination with the thills, an axle and a wheel, of seat standards mounted on said axle, a seat on said standards, a rod or shaft supported by the thills, and means for adjustably connecting the front end of the seat with said rod or shaft, substantially as set forth.

9. In a one wheeled vehicle, the combination with the axle and wheel, of adjustable props, secured to said axle, substantially as set forth.

10. In a one wheeled vehicle, the combination with an axle and wheel, of adjustable props secured to said axle, a lever for raising and lowering said props, and wheels mounted in the lower ends of said props, substantially as set forth.

11. A prop for a one-wheeled vehicle, comprising two parts having interlocking teeth, and each part having an elongated slot, and a bolt passing through said elongated slots whereby to secure said parts together, substantially as set forth.

12. The combination with an axle, and a central wheel, of props on the axle, and means for rocking the axle whereby to throw the props in and out of operative position, substantially as set forth.

13. The combination with an axle, a central wheel and shafts or thills, of extensible props on the axle and means for rocking the axle to raise or lower the props, substantially as set forth.

14. The combination with an axle, and shafts or thills, of a seat, extensible standards connecting the seat to the axle, and braces extending from the seat to the thills or shafts, said braces adjustably connected with the shafts or thills, substantially as set forth.

In testimony whereof I have signed this specification in the presence of two subscribing witnesses.

GODFRIED SCHUMACHER.

Witnesses:
  J. D. HULBERT,
  G. A. BOAZ.